(12) United States Patent
Niwata et al.

(10) Patent No.: US 10,563,706 B2
(45) Date of Patent: Feb. 18, 2020

(54) HYDRAULIC POWER TRANSMISSION DEVICE

(71) Applicant: HONDA MOTOR CO., LTD., Tokyo (JP)

(72) Inventors: Kenji Niwata, Wako (JP); Eisuke Hosoda, Wako (JP); Satoshi Imamori, Wako (JP); Tetsuya Otani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 59 days.

(21) Appl. No.: 15/757,438

(22) PCT Filed: Sep. 7, 2016

(86) PCT No.: PCT/JP2016/076356
§ 371 (c)(1),
(2) Date: Mar. 5, 2018

(87) PCT Pub. No.: WO2017/047475
PCT Pub. Date: Mar. 23, 2017

(65) Prior Publication Data
US 2018/0245642 A1 Aug. 30, 2018

(30) Foreign Application Priority Data

Sep. 14, 2015 (JP) .................................. 2015-180727
Sep. 14, 2015 (JP) .................................. 2015-180730

(51) Int. Cl.
*F16D 25/0638* (2006.01)
*F16D 48/02* (2006.01)
(Continued)

(52) U.S. Cl.
CPC ....... *F16D 25/0638* (2013.01); *F16D 13/644* (2013.01); *F16D 25/083* (2013.01);
(Continued)

(58) Field of Classification Search
CPC .... F16D 25/0638; F16D 25/14; F16D 25/083; F16D 13/644; F16D 13/52; F16D 48/02; F16D 2048/0221
See application file for complete search history.

(56) References Cited

U.S. PATENT DOCUMENTS

| 4,308,940 A | 1/1982 | Cadee |
| 2014/0290407 A1 | 10/2014 | Tsuchihashi et al. |

FOREIGN PATENT DOCUMENTS

| JP | 55-78821 A | 6/1980 |
| JP | 62-166140 U | 10/1987 |

(Continued)

OTHER PUBLICATIONS

Notice of Reasons for Refusal dated May 22, 2018, issued in counterpart Japanese Application No. 2017-539858, with English translation. (13 pages).

(Continued)

*Primary Examiner* — Huan Le
(74) *Attorney, Agent, or Firm* — Westerman, Hattori, Daniels & Adrian, LLP

(57) ABSTRACT

Provided is a hydraulic power transmission device enabling to minimize a pressure loss in an oil passage downstream from a piston chamber of a hydraulic clutch, and to properly prevent reduction in transmission torque capacity in the hydraulic clutch. Left and right pressure regulating valves (8L, 8R) regulating pressure of oil flowing out from piston chambers (59L, 59R) of left and right clutch devices (5L, 5R) are arranged adjacent to a downstream of the piston chamber (59). This can shorten an oil passage from the piston chamber (59) to the pressure regulating valve (8) and minimize pressure loss in the oil passage. Due to better flexibility of arrangement of the pressing load receiving member (82) receiving a pressing force (thrust) of the piston member (57), thrust efficiency of the hydraulic piston (57) improves to properly prevent reduction in transmission torque capacity in the hydraulic clutch (5).

10 Claims, 5 Drawing Sheets

(51) Int. Cl.
    *F16D 25/08*     (2006.01)
    *F16D 13/64*     (2006.01)
    *F16D 13/52*     (2006.01)

(52) U.S. Cl.
    CPC .............. *F16D 25/14* (2013.01); *F16D 48/02* (2013.01); *F16D 13/52* (2013.01); *F16D 2048/0221* (2013.01)

(56) References Cited

FOREIGN PATENT DOCUMENTS

| JP | 3-102623 U | 10/1991 |
| JP | 6-63939 U | 9/1994 |
| JP | 2004-156653 A | 6/2004 |
| JP | 2004-197777 A | 7/2004 |
| JP | 3124493 U | 8/2006 |
| JP | 2011-149535 A | 8/2011 |
| JP | 2014-194242 A | 10/2014 |

OTHER PUBLICATIONS

International Search Report dated Dec. 13, 2016, issued in counterpart application No. PCT/JP2016/076356. (2 pages).
Office Action dated Jan. 2, 2019, issued in counterpart CN application No. 201680052578.9, with English translation. (11 pages).
Chinese Search Report dated Jan. 2, 2019, issued in counterpart application No. 2016800525789, with English translation. (6 pages).

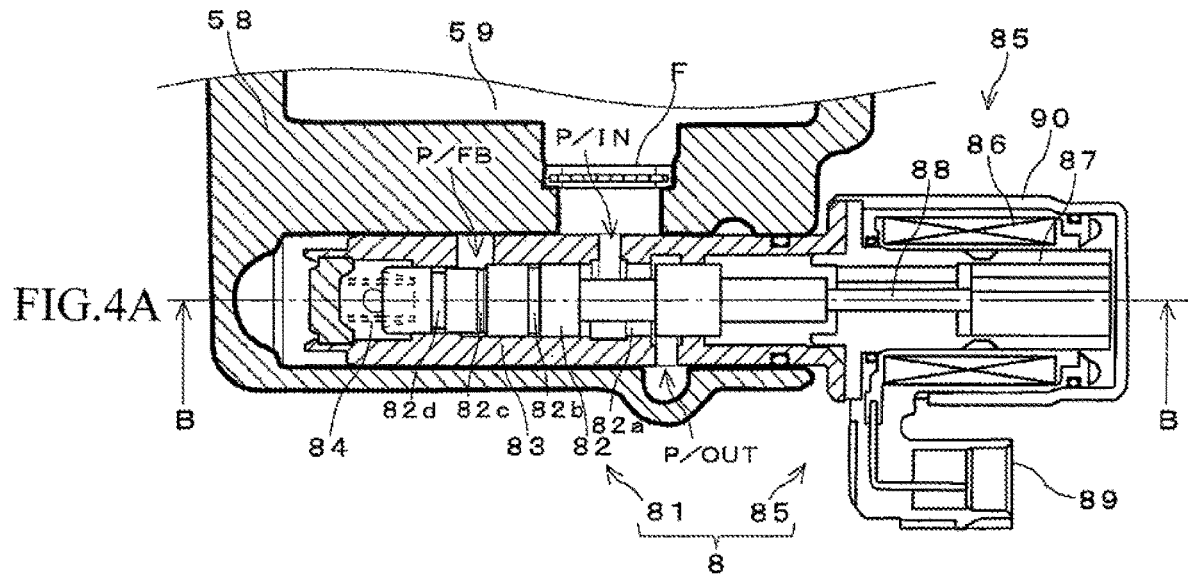
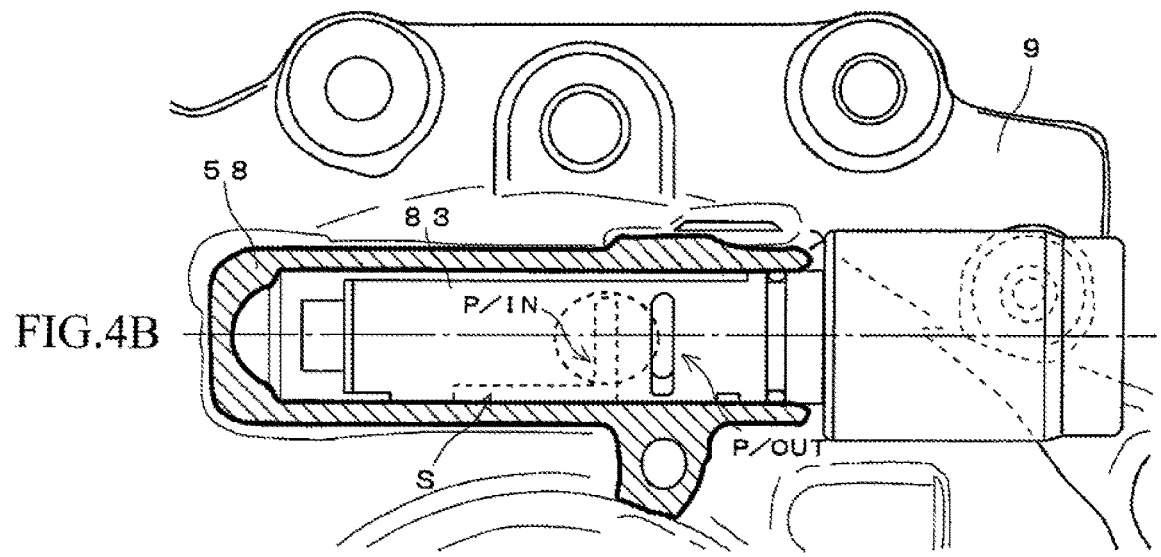

HYDRAULIC POWER TRANSMISSION DEVICE

TECHNICAL FIELD

The present invention relates to a hydraulic power transmission device including a hydraulic clutch. More specifically, a hydraulic piston presses friction materials to engage a clutch whereby the hydraulic power transmission device that transmits a driving force.

BACKGROUND ART

A multiple disc clutch mechanism is mainly composed of a bottomed cylindrical clutch guide and a clutch hub arranged concentrically inside the clutch guide. On one hand, a plurality of separator plates (friction materials) is attached on an inner periphery of the clutch guide due to spline fitting (connection). On the other hand, on an outer periphery of the clutch hub, a plurality of friction plates (friction materials) is attached alternately with the separator plates due to spline fitting. For example, refer to Patent Document 1.

Moreover, the multiple disc clutch mechanism includes a hydraulic piston for applying a pressing force to a laminate (frictional engagement member) of the separator plates and the friction plates for press-fitting the laminate and a piston chamber for driving the hydraulic piston. Accordingly, hydraulic fluid (oil) is supplied to the piston chamber to drive the hydraulic piston in the axial direction, and thus the hydraulic piston presses the frictional engagement member in the axial direction. Thus, a torque is transmitted between the clutch guide side and the clutch hub side. Transmission torque capacity of the multiple disc clutch mechanism varies depending on a fastening degree of the frictional engagement member. Therefore, a pressing load receiving member for receiving the pressing force of the hydraulic piston is provided at a rear of the clutch guide so that the pressing force applied by the hydraulic piston is efficiently transmitted to the frictional engagement member.

In addition, a hydraulic control device (hydraulic control circuit) is known as a hydraulic control circuit for supplying oil to the multiple disc clutch mechanism. This hydraulic control device includes an oil strainer for storing oil an electric oil pump for pumping up and forcibly feeding the oil from the oil strainer to an oil passage, a piston chamber for driving the hydraulic piston for engaging a clutch, a linear solenoid valve provided downstream of the piston chamber for adjusting pressure of the hydraulic fluid to a predetermined pressure, an outgoing oil passage leading to the piston chamber from the electric oil pump and an incoming oil passage leading to the linear solenoid valve from the piston chamber. For example, see Patent Document 2.

In the hydraulic control circuit described in Patent Document 2, the oil pumped up from the oil strainer by the electric oil pump is supplied to the piston chamber of the hydraulic piston via the outgoing oil passage, and then supplied to the linear solenoid valve via the incoming oil passage from the piston chamber. After adjusted here to the predetermined hydraulic pressure, the oil is partly returned to the oil strainer, and the remainder thereof is supplied for lubrication to a rotation sliding member such as a bearing and a clutch. Further, the linear solenoid valve is stored in a case called "hydraulic control body" as the linear solenoid valve is controlled by a computer on the basis of a signal output from an oil pressure sensor.

In the above-described hydraulic control circuit, the piston chamber of the hydraulic piston is provided at a shaft end of a farthest clutch from the hydraulic control body. This causes the problem that the oil passage from the piston chamber to the hydraulic control body becomes long along with a large pressure loss.

As the downstream from the linear solenoid valve is atmospherically released, a pressure loss from the piston chamber to the linear solenoid valve acts as an operating pressure on the piston chamber.

In particular, due to higher viscosity of the hydraulic fluid at an ultralow temperature, the pressure loss in the oil passage grows larger, and consequently, the pressure loss generates a clutch operating pressure also at an instructed oil pressure of zero (in the state of linear solenoid full opening). This results in clutch dragging, which might cause problems such as impacting on vehicle behavior due to transmission of a driving force to rear wheels and deteriorating fuel consumption rate.

Moreover, the oil pressure transmission device described in Patent Document 1 performs shaft core lubrication of a rotation sliding member such as a bearing and a clutch by supplying oil via an oil passage (shaft core oil passage) formed inside a center shaft. In this shaft core lubrication, a hydraulic control body is arranged above the center shaft and in the vicinity of the center of the device so that lubrication oil is equal in quantity between left and right clutches.

As described in Patent Document 1, a taper roller bearing or an angular ball bearing is used as a bearing for the center shaft to which a hypoid gear is spline-coupled for transmitting a driving force approximately at a right angle. Conventionally, for the improvement of assemblability, these bearings having an additional tightening margin are fixed to a case using a ring member (bearing set plate) whose central part is opened.

In the case of the shaft core lubrication in which the hydraulic control body is arranged above the center shaft and in the vicinity of the center of the device, flexibility as to where the pressing load receiving member for receiving a pressing force of the hydraulic piston is arranged depends on where the hydraulic control body is arranged. As a result, the pressing load receiving member is arranged so as to be offset to a pressing position of the hydraulic piston, whereby the thrust efficiency of the hydraulic piston at the time of clutch engagement deteriorates and the transmission torque capacity of the clutch might fall below a required amount.

The bearing set plate for adding a tightening margin to the taper roller bearing, etc. is fastened and fixed to the case by a volt.

However, the arrangement of the volt restricts the flexibility as to where to arrange the pressing load receiving member. Consequently, similar to the arrangement of the hydraulic control body, the pressing load receiving member is offset to a pressing position of the hydraulic piston, whereby the transmission torque capacity at the time of clutch engagement might fall short of the required amount.

RELATED ART DOCUMENTS

Patent Documents

[Patent Document 1] Japanese Unexamined Patent Application Publication No. 2014-194242

[Patent Document 2] Japanese Patent Application Publication No. 2011-149535

DISCLOSURE OF THE INVENTION

Problems to be Solved by the Invention

The present invention was achieved in view of the above-described conventional technical problems, and the purpose is to provide the hydraulic power transmission device that can minimize a pressure loss in the oil passage downstream from the piston chamber of the hydraulic clutch.

Moreover, another purpose of the present invention is to provide the hydraulic power transmission device that can prevent the reduction in transmission torque capacity at the time of clutch engagement by eliminating an offset between a pressing position of the hydraulic piston and a receiving position of a pressing force thereof.

Means of Solving the Problems

In order to achieve the above purposes, a hydraulic power transmission device of the present invention includes an input shaft (4) to which a driving force is transmitted from a driving source, a hydraulic clutch (5) for disconnecting the driving force transmitted to the input shaft (4), and an output shaft (6) connected to the input shaft (4) via the hydraulic clutch (5). The hydraulic clutch (5) includes frictional engagement elements (51, 52) for disconnecting the driving force, and a piston chamber (59) for driving a piston member (57) that applies a pressing force to the frictional engagement elements (51, 52). The hydraulic clutch (5) also includes a pressure regulating valve (8) communicating to a piston chamber (59) and adjusting pressure of hydraulic fluid flowing out from the piston chamber (59). The pressure regulating valve (8) is arranged adjacent to the piston chamber (59).

In this configuration, the pressure regulating valve (8) for adjusting pressure of the hydraulic fluid that flows out from the piston chamber (59) of the hydraulic clutch (5) is provided adjacent to the piston chamber (59). This can shorten the oil passage leading to the pressure regulating valve (8) from the piston chamber (59) so as to minimize the pressure loss in the oil passage.

Furthermore, as the pressure regulating valve (8) is provided adjacent to the piston chamber (59) of the hydraulic clutch (5), the hydraulic control body that has been needed in the conventional hydraulic power transmission device becomes needless, and the oil passage leading to the hydraulic control body from the piston chamber (59) also becomes needless. This enables to downsize the whole device and reduce manufacturing cost.

In addition, in this hydraulic power transmission device, the frictional engagement elements (51, 52) of the hydraulic clutch (5) include a clutch hub (52) arranged either on an input shaft (4) side or on an output shaft (6) side, a clutch guide (51) arranged on the other side of the input shaft (4) side and the output shaft (6) side, and a frictional engagement member in which a first friction material (53) engaged with a clutch hub (52) and a second friction material (54) engaged with the clutch guide (51) are laminated alternately. The clutch hub (52) is provided with a first through hole (52a) communicating to a bearing (13) supporting the clutch hub (52) and a second through hole (52b) communicating to an outer periphery from an inner periphery of the clutch hub (52) in the diameter direction.

In this configuration, as each of the first through hole (52a) and the second through hole (52b) is formed on the clutch hub (52), the hydraulic fluid discharged from the pressure regulating valve (8) can be introduced to each of the bearing (13) and the frictional engagement member for suitable lubrication thereof.

Further, in this hydraulic power transmission device, on an outer diameter side of an opening of the first through hole (52a), or on an outer diameter side of an opening of the second through hole (52b), a projection (52c) axially projecting to cover the outer diameter side of the opening may be formed.

In this configuration, the projection (52c) is provided on the outer diameter side of the opening of the first through hole (52a) or the second through hole (52b). Thus, even if a centrifugal force acts on the introduced hydraulic fluid, the projection (52c) serves as a guide member for the hydraulic fluid to guide (introduce) the hydraulic fluid into the first through hole (52a) or the second through hole (52b), thereby enabling to lubricate the bearing (13) and the frictional engagement member.

Furthermore, this hydraulic power transmission device includes a case (58) for accommodating at least a part of the hydraulic power transmission device and a discharge port (60a) formed on the inner periphery of the case (58) for discharging the hydraulic fluid discharged from the pressure regulating valve (8). On the outer diameter side of the discharge port (60a), another projection (60b) axially projecting to cover the outer diameter side of the discharge port (60a) may be provided.

In this configuration, the other projection (60b) axially projecting to cover the outer diameter side of the discharge port (60a) is provided on the outer diameter side of the discharge port (60a) on the inner periphery of the case (58). Thus, even if a centrifugal force acts on the introduced hydraulic fluid, the discharge port (60a) serves as a guide member for the hydraulic fluid to guide (introduce) the hydraulic fluid to the hydraulic clutch (5, 6) and lubricate the rotation sliding member such as the bearing.

Moreover, the hydraulic power transmission device according to the present invention includes an input shaft (4) to which a driving force is transmitted from a driving source, a hydraulic clutch (5) for disconnecting the diving force transmitted to the input shaft (4) and an output shaft (6) connected to the input shaft (4) via the hydraulic clutch (5). The hydraulic clutch (5) includes frictional engagement elements (51, 52) for disconnecting the driving force, a piston member (57) for applying a pressing force to the frictional engagement elements (51, 52), a piston chamber (59) for driving the piston member (57) and a pressing load receiving member (82) for receiving a pressing load of the piston member (57) applied to the frictional engagement element (51, 52). The hydraulic power transmission device also includes a pressure regulating valve (8) communicating to the piston chamber (59) and adjusting pressure of the hydraulic fluid that flows out from the piston chamber (59). The pressure regulating valve (8) is arranged adjacent to the piston chamber (59). A pressing member (81) of the piston member (57) and the pressing load receiving member (82) are arranged at substantially a same position in the diameter direction.

In this configuration, the pressure regulating valve (8) for adjusting pressure of the hydraulic fluid flowing out from the piston chamber (59) of the hydraulic clutch (5) is arranged adjacent to the piston chamber (59) of the hydraulic clutch (5). This enables the hydraulic fluid discharged from the pressure regulating valve (8) to be directly introduced inside the hydraulic clutch (5) (namely, to the frictional engagement elements) without through the oil passage (shaft core oil passage) formed inside the input shaft or the output shaft. This necessitates no hydraulic control body that has been needed for conventional shaft core lubrication, resulting in better flexibility of the arrangement of the pressing load receiving member (82) for receiving a pressing force (thrust) of the piston member (57). Thus, the pressing load receiving member (82) and the pressing member (81) of the piston member (57) can be arranged at substantially the same position in the diameter direction.

Furthermore, as the pressing member (81) of the piston member (57) and the pressing load receiving member (82) are arranged at substantially the same position in the diameter direction, there is no offset between a pressing position of the piston member (57) and a receiving position of the pressing force at the time of clutch engagement. This can contribute to the improvement of thrust efficiency of the hydraulic piston (57) so as to properly prevent the reduction in transmission torque capacity in the hydraulic clutch (5).

In addition, the above-described hydraulic power transmission device may include a case (9) accommodating at least a part of the hydraulic power transmission device. The pressing load receiving member (82) may be a projection that is a part of the case (9) opposite to the frictional engagement elements (51, 52). This part is projected in the axial direction towards the frictional engagement elements. According to this configuration, the pressing load receiving member for receiving the pressing load of the piston member applied to the frictional engagement elements can be configured using the part of the case accommodating the hydraulic clutch. This can achieve the simplification of the configuration with a minimized piece-part count.

Moreover, this hydraulic power transmission device may include a bearing (11, 12) rotatably supporting the input shaft (4) and the case (9) accommodating at least the part of the hydraulic power transmission device. The bearing (11, 12) may be fixed due to a structure in which the bearing (11, 12) is sandwiched between a stepped part (9a, 9b) of the case (9) and a stepped part (4aa, 3a) of the input shaft (4) supported by this bearing.

In this configuration, the bearing (11, 12) is fixed due to the structure in which the bearing (11, 12) is sandwiched between the stepped part (9a, 9b) of the case (9) and the stepped part (4aa, 3a) of the input shaft (4). This makes needless a bearing set plate that has conventionally been needed as a fixing means for the bearing and a fixing volt for the bearing set plate. This improves the flexibility of the arrangement of the pressing load receiving member (82) for receiving a pressing force (thrust) of the piston member (57), enabling to arrange the pressing load receiving member (82) and the pressing member (81) of the piston member (57) at substantially the same position in the diameter direction.

Furthermore, in this hydraulic power transmission device, the piston member (57) and the pressing load receiving member (82) respectively include a first thrust bearing (83) and a second thrust bearing (84) rotatably supporting the fictional engagement elements (51, 52). The first thrust bearing (83) and the second thrust bearing (84) may be arranged at substantially a same position in the diameter direction.

In this configuration, as the first thrust bearing (83) and the second thrust bearing (84) are arranged at substantially the same position in the diameter direction, what is called "clutch series push structure" can be achieved. In this structure, a pressing force of the piston member (57) is received at the same position in the diameter direction and the clutch is engaged. Elimination of the offset between the pressing position of the hydraulic piston member (57) and the receiving position of the pressing force thereof at the time of clutch engagement can improve the thrust efficiency of the piston member (57) and appropriately prevent the reduction in transmission torque capacity in the hydraulic clutch (5).

Moreover, this hydraulic power transmission device may be configured so that the hydraulic fluid discharged from the pressure regulating valve (8) is introduced to the frictional engagement element (51, 52) of the hydraulic clutch (5) without through the inside of the input shaft (4) or the output shaft (6).

According to this configuration, the hydraulic fluid discharged from the pressure regulating valve (8) is introduced inside the frictional engagement elements (51, 52) of the hydraulic clutch (5) without through the inside of the input shaft (4) or the output shaft (6). Thus, the inside of the hydraulic clutch (5) can be properly lubricated without the lubrication of the oil passage (shaft core oil passage) formed inside the input shaft (4) or the output shaft (6).

In addition, in this hydraulic power transmission device, the output shaft (6) may be a pair of rotation shafts (6L, 6R) extending in the width direction of the vehicle so as to transmit a driving force to left and right driving wheels of the vehicle. The hydraulic clutch (5) may be a pair of clutches (5L, 5R) each of which is arranged between the input shaft (4) and each of the rotation shafts (6L, 6R). The pressure regulating valve (8) may a pair of pressure regulating valves (8L, 8R) each of which is arranged adjacent to an outer side of each of a pair of clutches in the width direction.

In this configuration, as the output shaft (6) is the pair of rotation shafts (6L, 6R), the hydraulic clutch (5) is the pair of clutches (5L, 5R) and the pressure regulating valve (8) is the pair of the pressure regulating valves (8L, 8R), the hydraulic power transmission device of the present invention can be applied to a differential of the vehicle. In this way, a desired torque can be distributed to each of the left and right driving wheels when engaging the clutches (5L, 5R). Note that the reference numerals in parenthesis for the means of solving these problems are exemplarily given only for the purpose of referring to the reference numerals of corresponding elements in an embodiment that will be described below.

Effects of the Invention

According to the hydraulic power transmission device of the present invention, as the length of the oil passage leading to the pressure regulating valve from the piston chamber can be shortened, the loss of pressure in the oil passage leading to the pressure a regulating valve from the piston chamber can be minimized. Furthermore, the hydraulic control body needed in the conventional hydraulic power transmission device and the oil passage leading to the hydraulic control body from the piston chamber also become needless. This enables to downsize the whole device and reduce manufacturing cost. If the hydraulic power transmission device of the present invention is applied to the differential of the vehicle, the impact on the vehicle behavior due to clutch dragging and the deterioration of fuel consumption rate can be prevented appropriately.

According to the hydraulic power device of the present invention, as the pressure regulating valve for adjusting pressure of the hydraulic fluid discharged from the piston chamber of the hydraulic clutch is provided adjacent to the piston chamber of the hydraulic clutch, the hydraulic control body needed for the conventional shaft core lubrication becomes needless. In addition, as the bearing is fixed due to the structure in which the bearing is sandwiched at the front and rear thereof in the axial direction, the bearing set plate that has conventionally been needed as the fixing means for the bearing and the fixing volt for the bearing set plate become needless.

In this way, as the hydraulic control body, the bearing set plate and the fixing volt for the bearing set plate become needless, the flexibility of the arrangement of the pressing load receiving member for receiving a pressing force of the piston member improves, and the pressing load receiving member and the pressing position of the piston member can be arranged at the same position in the diameter direction. Thus, the clutch series push structure, in which the pressing force of the piston member is received at the same position in the diameter direction, can be achieved.

Moreover, elimination of the offset between the pressing position and the receiving position of the clutch at the time of clutch engagement can improve the thrust efficiency of the piston member and appropriately prevent the reduction in transmission torque capacity in the hydraulic clutch.

Furthermore, if the hydraulic power transmission device of the present invention is applied to the differential of the vehicle, a desired torque can be distributed to each of the left and right driving wheels at the time of clutch engagement.

BRIEF DESCRIPTION OF THE DRAWINGS

FIG. 4A and FIG. 4B are sectional views of a main part of a pressure regulating valve according to the present invention.

MODE FOR CARRYING OUT THE INVENTION

Embodiments of the present invention are hereinafter described in detail with reference to attached drawings.

Figure 1:
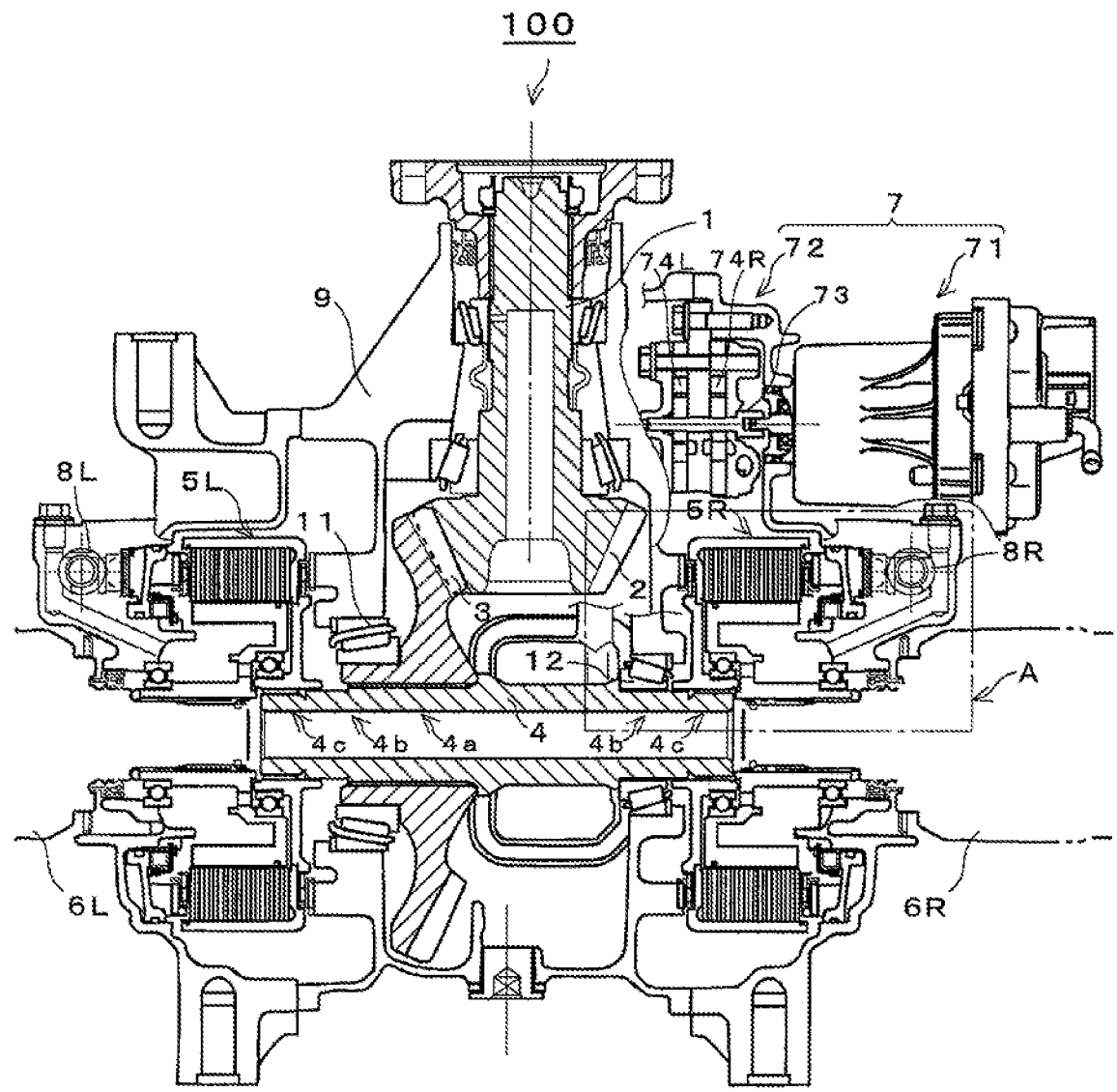
FIG. 1 is a sectional view of a main part of a hydraulic driving force transmission device according to an embodiment of the present invention.
Figure 2:
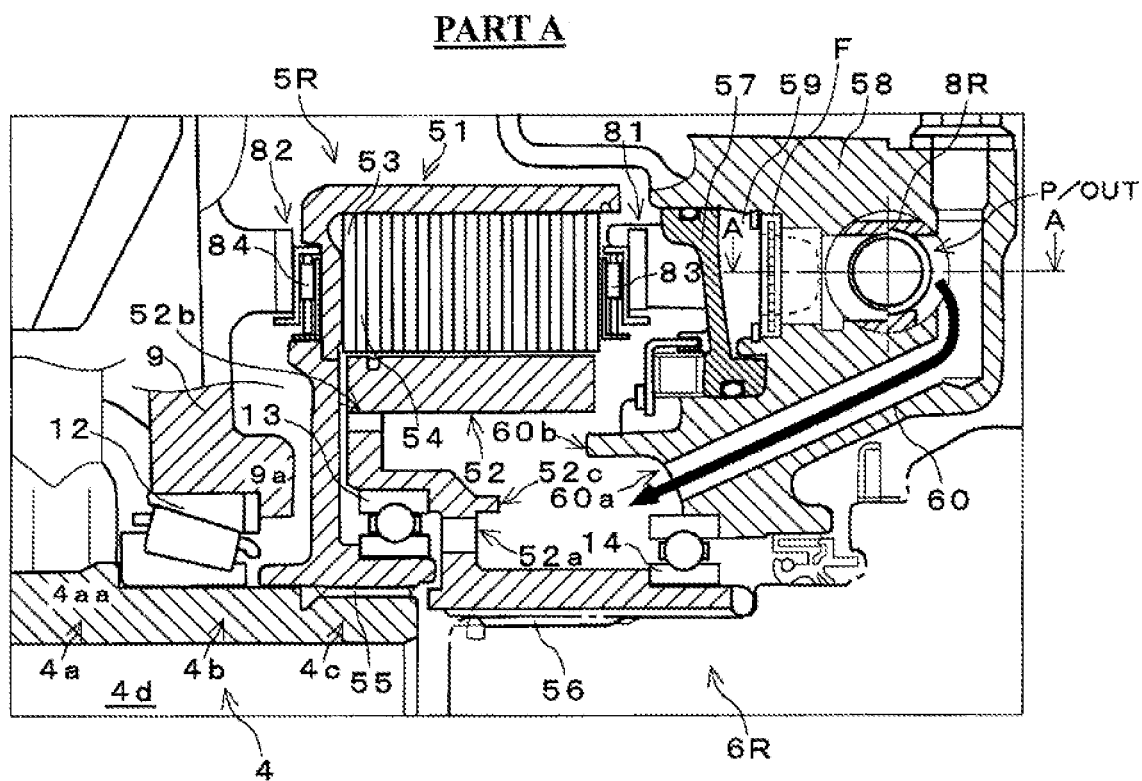
FIG. 2 is an enlarged view of Part A in FIG. 1.
Figure 3:
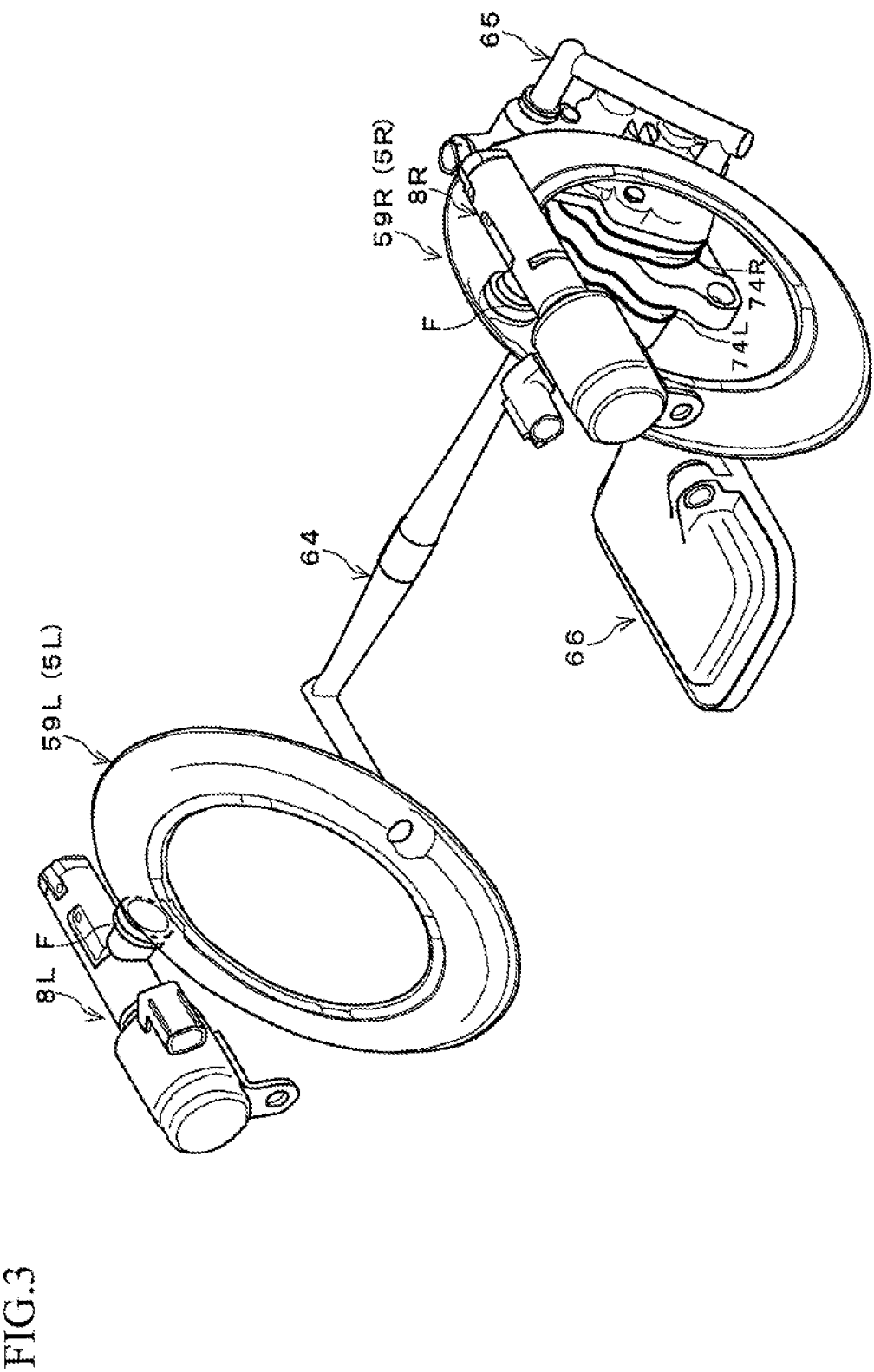
FIG. 3 is a perspective view for illustrating a hydraulic circuit of a hydraulic power transmission device.

FIG. 1 is a sectional view of a main part of a hydraulic driving force transmission device 100 according to an embodiment of the present invention; FIG. 2 is an enlarged view of Part A in FIG. 1; and FIG. 3 is a perspective view for illustrating a hydraulic circuit of this hydraulic power transmission device 100. This hydraulic power transmission device 100 is configured to be a differential mechanism for distributing rotation of a drive shaft 1 to left and right wheels (not shown in the figure). A drive shaft 1 is connected to a propeller shaft, which is not shown in the figure, and a driving force from a driving source (engine), which is not shown in the figure, is transmitted to the drive shaft 1. The hydraulic power transmission device 100 includes a drive bevel gear 2 that rotates integrally with the drive shaft 1, a driven bevel gear 3 that meshes with the drive bevel gear 2, a center shaft 4 arranged at right angle to the drive shaft 1 and connected to the bevel gear 3 so as to rotate integrally therewith, left and right clutch devices 5L, 5R arranged respectively to the left and right of the center shaft 4, left and right output shafts 6L, 6R for transmitting driving force transmitted respectively by the left and right clutch devices 5L, 5R to the left and right wheels (not shown in the figure), an electric oil pump 7 for supplying hydraulic fluid (oil) to a piston chamber 59 (FIG. 2) of each of the left and right clutch devices 5L, 5R, left and right pressure regulating valves 8L, 8R for adjusting pressure of oil discharged from each piston chambers 59 (FIG. 2) of the left and right clutch devices 5L, 5R and a differential case 9 covering (accommodating) the differential mechanism. Each of the above configurations will be further described below.

The center shaft 4 is supported by the differential case 9 of the differential mechanism via taper bearings 11, 12. The center shaft 4 is configured roughly to include a large diameter section 4a at the center, a medium diameter section 4b to the left and right of the large diameter section 4a and a small diameter section 4c being left and right ends adjacent to the medium diameter section 4b. The bevel gear 3 is fixed to the large diameter section 4a so that the whole center shaft 4 rotates integrally therewith. A plurality of spline teeth is formed at each of the small diameter sections 4c being left and right ends of the center shaft 4 in the circumferential direction and spline-connected to a clutch guide 51 (FIG. 2) of each of the left and right clutch devices 5L, 5R so as to rotate integrally therewith.

The left and right clutch devices 5L, 5R are composed of wet-type multiple disc clutches (hydraulic clutches). As the left and right clutch devices 5L, 5R have the same configuration, only the right clutch device 5R will be described with reference to FIG. 2 here. For the similar reason, additional characters "L" and "R" will be omitted in the following description unless necessary to distinguish them in particular.

As illustrated in FIG. 2, a plurality of separator plates (first friction materials) 53 are aligned in the axial direction at a predetermined interval on and spline-connected to an inner periphery of the clutch guide 51 that is a rotation member on the input side. A plurality of friction plates (second friction materials) 54 are aligned in the axial direction at a predetermined interval on and spline-connected to an outer periphery of the clutch hub 52 that is a rotation member on the output side. Each of the separator plates 53 and each of the friction plates 54 are alternately aligned in the axial direction so as to form a laminate of the separator plates 53 and the friction plates 54. A spline member 55 is formed near the root of the clutch guide 51. The spline member 55 is spline-connected to the small diameter section 4c being the right end of the center shaft 4.

In the similar manner, a spline member 56 is formed at the root of the clutch hub 52. Therefore, the spline member 56 is spline-connected to the right output shaft 6R, and the clutch hub 52 is fixed rotatably to the case 58 via a ball bearing 14 so as to rotate integrally with the right output shaft 6R. On the other hand, the clutch guide 51 and the clutch hub 52 are supported mutually via a ball bearing 13 so as to rotate relatively.

The laminate (frictional engagement member) of the separator plates 53 and the friction plates 54 is driven in the axial direction (in the left direction in FIG. 2) by a piston 57 at the time of clutch engagement. In response to the driving of the piston 57, the separator plates 53 are frictionally engaged with the friction plates 54 to engage the clutch. The piston 57 is hydraulically driven by the piston chamber 59 and controlled so as to obtain a necessary clutch fastening amount in the frictional engagement member.

A pressing member 81 projected in the axial direction (in the left direction in the figure) is formed on the side of the piston 57 opposite to the fictional engagement member for pressing the frictional engagement member. A first thrust bearing 83 rotatably supporting the frictional engagement member in the thrust direction is attached at the tip of the pressing member 81. On the other hand, at a position opposite to the rear side of the clutch guide 51 in the case 9, a pressing load receiving member 82 projected in the axial direction (in the right direction in the figure) is formed for receiving a pressing load of the piston 57 applied to the frictional engagement member. At the tip of the pressing load receiving member 82, a second thrust bearing 84 is attached for rotatably supporting the clutch guide 51 in the thrust direction. It should be noted that the first thrust bearing 83 and the second thrust bearing 84 are arranged at a same height position or substantially a same height position in the diameter direction. This causes no offset between a pressing position of the piston 57 and a receiving position of a pressing force thereof and improves thrust efficiency of the piston 57 at the time of clutch engagement, thereby enabling to secure a necessary transmission torque capacity in the clutch device 5.

Further, a taper bearing 12 rotatably supporting the center shaft 4 is sandwiched along the axial direction (longitudinal direction), for fixation, by a stepped part 9a of the case 9 and a stepped part 4aa of the large diameter section 4a of the center shaft 4. In the same way, as illustrated in FIG. 1, the taper bearing 11 supporting the center shaft 4 is sandwiched along the axial direction, for fixation, by a stepped part 9b of the case 9 and a stepped part 3a formed at the driven bevel gear 3. In this manner, the taper bearings 11, 12 are fixed due to the structure in which the taper bearings 11, 12 are sandwiched by the stepped parts 9a, 9b of the case 9 and respectively the stepped part 4aa of the center shaft 4 supported by the taper bearings 11, 12 and the stepped part of 3a of the driven bevel gear 3. Therefore, this hydraulic power transmission device 100 needs no bearing set plate and fixing volt for fixing the bearing set plate that are conventionally used as fixing means. Consequently, the flexibility of the arrangement of the pressing load receiving member 82 improves, enabling to arrange the first thrust bearing 83 and the second thrust bearing 84 at the same height position or substantially the same height in the diameter direction. Thus, what is called a clutch series push structure can be achieved. In this structure, the pressing force of the piston member 57 is received at the same height position or substantially the same height position in the diameter direction.

Moreover, the center shaft 4 serves as "an input shaft" for the left and right clutch devices 5L, 5R, and the left and right output shafts 6L, 6R serve as "output shafts" for the left and right clutch devices 5L, 5R.

Back to FIG. 1, the electric oil pump 7 is composed of a motor member 71 for generating rotating power and a pump member 72 for pumping up hydraulic fluid (oil) from an oil strainer 66 (FIG. 3) due to the rotating power of the motor member 71 and forcibly feeding the hydraulic fluid to the left and right clutch devices 5L, 5R. The pump member 72 has a tandem pump structure in which left and right internal gear pumps 74L, 74R are connected in series on a pump shaft 73. It should be noted that in this embodiment, for example, the left internal gear pump 74L forcibly feeds the oil to a piston chamber 59L of the left clutch device 5L, and the right internal gear pump 74R forcibly feeds the oil to a piston chamber 59R of the right clutch device 5R.

The left and right pressure regulating valves 8L, 8R are composed of linear solenoid valves (electromagnetic pressure regulating valve). As illustrated in FIG. 3, the left and right pressure regulating valves 8L, 8R in this embodiment are arranged almost symmetrically to each other and respectively right beside the piston chambers 59L, 59R of the left and right clutch devices 5L, 5R. Therefore, oil passages from the left and right piston chambers 59L 59R to the left and right pressure regulating valves 8L, 8R are configured at a shortest distance. Therefore, an oil passage 64 inside the case for supplying oil to the left piston chamber 59L and an passage 65 inside the case for supplying oil to the right piston chamber 59R are all that are needed as oil passages from the left and right internal gear pumps 74L, 74R to the left and right pressure regulating valves 8L, 8R.

It should be noted that as the left and right pressure regulating valves 8L, 8R have the same configuration, additional characters "L" and "R" will be omitted in the following description unless necessary to distinguish them in particular.

FIG. 4A and FIG. 4B are sectional views of a main part of the pressure regulating valve 8 according to the present invention. FIG. 4A is a cross-sectional view (A-A) of FIG. 2, and FIG. 4B is a cross-sectional view (B-B) of FIG. 4A.

As illustrated in FIG. 4A, the pressure regulating valve 8 is configured in the way that a linear solenoid 85 is connected in line to a pressure-regulating valve 81 composed of a valve body 82, a body 83 and a spring 84.

The linear solenoid 85 is composed of a coil 86 that generates lines of magnetic force, a hollow cylindrical magnetism 87 that magnetically permeates the lines of magnetic force generated by the coil 86, a plunger 88 driven in the axial direction due to the action of the lines of magnetic force, a feeding member 89 that supplies an electric current to a coil 86 and the case 90 covering up the whole thereof. The plunger 88 is joined to an edge of the valve body 82, and the magnetism 87 is joined to the body 83.

An inlet port P/IN, an outlet port P/OUT and a feedback port P/FB are formed on the body 83. A first annular oil passage 82a, a second annular oil passage 82b, a third annular oil passage 82c and a fourth annular oil passage 82d are formed between the valve body 82 and the body 83.

While the first annular oil passage 82a communicates between the inlet port P/IN and the outlet port P/OUT, the second annular oil passage 82b, the third annular oil passage 82c and the fourth annular oil passage 82d are intended for the oil discharged from the piston chamber 59 to act on the valve body 82 as feedback pressure. As illustrated in FIG. 4B, a gap S is formed partially between the piston case 58 and the body 83 so that the oil discharged from the piston chamber 59 flows into the feedback port P/FB through the gap S to act on the valve body 82 as feedback pressure.

Therefore, the oil that flows into the inlet port P/IN from the piston chamber 59 of the clutch device 5 through a filter F is adjusted to a hydraulic pressure at which three kinds of forces, that are, a feedback pressure (oil pressure) of the oil discharged from the piston chamber 59, a thrust of the plunger 88 of the linear solenoid 85 and an elasticity of the spring 84 acting on the valve body are in balance with one another, and is thus discharged downstream from the outlet port P/OUT of the pressure regulating valve 8.

Moreover, as illustrated in FIG. 4A, the pressure regulating valve 8 is arranged adjacent to the piston chamber 59, or in other words, right beside the piston chamber 59. In this way, as the pressure regulating valve 8 is arranged right beside the piston chamber 59, the oil passage can communicate from the piston chamber 59 to the inlet port P/OUT of the pressure regulating valve 8 at the shortest distance, thereby enabling to minimize a pressure loss of the oil passage leading to the pressure regulating valve 8 from the piston chamber 59. In addition, as will be described alter, the oil discharged from the outlet port P/OUT of the pressure regulating valve 8 can be introduced inside the clutch device 5 without through a shaft core oil passage formed inside the shaft.

In addition, as illustrated in FIG. 4B, the pressure regulating valve 8 is equipped (or attached externally) on the differential case 9. Thus, as the pressure regulating valve 8 is equipped (or attached externally) on the differential case 9, there is no need to incorporate the pressure regulating valve 8 inside the differential case 9 as a hydraulic control body. This can result in the omission of the control body and the oil passage leading thereto from the piston chamber, which are needed in the conventional hydraulic power transmission device and accordingly in the downsizing of the whole device and the cost reduction.

Back to FIG. 2, inside the case 58, a lubrication oil passage 60 is formed for introducing the oil discharged from the outlet port P/OUT of the pressure regulating valve 8 directly into the clutch device 5. In the conventional hydraulic power transmission device, lubrication of the rotation sliding member such as the ball bearing, the separator plates and the friction plates, which are provided inside the clutch device, has been performed in the way that oil is supplied to the oil passage (shaft core oil passage) formed inside the shaft and then scattered due to a centrifugal force generated by rotation of the shaft, and thus the scattered oil is supplied, via a through hole (not shown in the figure) formed on an outer periphery of the shaft, to the rotation sliding member such as the ball bearing. In other words, the conventional hydraulic power transmission device has adopted shaft core lubrication.

In contrast, in the hydraulic power transmission device 100 of the present invention, the oil discharged from the outlet port P/OUT of the pressure regulating valve 8 is directly introduced into the clutch device 5 via the lubrication oil passage 60, but without through the oil passage (shaft core oil passage) formed inside the shaft. Then, the introduced oil is stirred by rotation of the clutch hub 52, thereby lubricating the rotation sliding member such as the ball bearings 13, 14. In other words, the hydraulic power transmission device 100 of the present invention adopts stirring lubrication. Therefore, a first through hole 52a is provided at a part of the clutch hub 52 opposite to the ball bearing 13 so that the oil introduced into the clutch device 5 via the lubrication oil passage 60 spreads over the ball bearings 13, 14 efficiently and equally. Furthermore, a second through hole 52b penetrating an inner periphery and an outer periphery of the clutch hub 52 in the diameter direction is provided so that the oil spreads over the separator plates 53 and the friction plates 54 efficiently and equally.

In addition, an eave-shaped member (projection) 52c covering the outer diameter side (outer edge side) of the first through hole 52a is provided so that the oil introduced into the first through hole 52a efficiently even in the case where a centrifugal force due to a rotation of the clutch hub 52 acts on the oil for lubrication. Also, for the similar reason, an eave-shaped member (projection) 60b (FIG. 2) covering the outer diameter side (outer edge side) of a discharge port 60a is provided right above the ball bearing 14 in the figure (outside the ball bearing 14 in the diameter direction). This eave-shaped member (projection) 52c will be described below.

Figure 5:
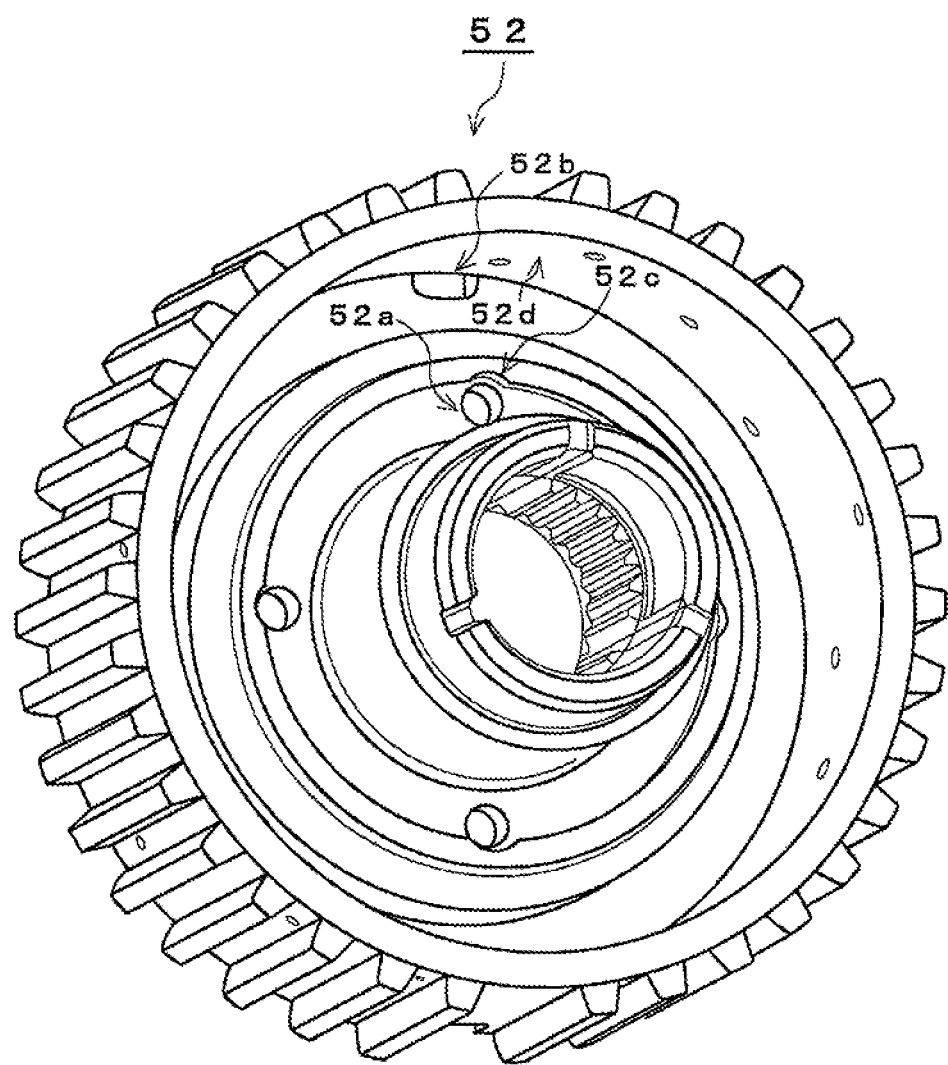
FIG. 5 is a perspective view of a clutch hub according to the present invention.

FIG. 5 is a perspective view of the clutch hub 52 according to the present invention. As described above, the first through hole 52a and the second through hole 52b are provided respectively at four and two parts of the clutch hub 52 at equal intervals so that the oil introduced into the clutch device 5 via the lubrication oil passage 60 spreads over the rotation sliding member such as the ball bearing, the separator plates and the friction plates efficiently and equally. It should be noted that the number of the through holes shown above is merely illustrative and not restrictive.

Furthermore, the eave-shaped member (projection) 52c extending in the axial direction is provided outside the first through hole 52a in the diameter direction. Thus, the oil spread outward in the diameter direction due to a centrifugal force generated by the rotation of the clutch hub 52 is introduced into the first through hole 52a by means of this eave-shaped member 52c for efficient lubrication of the ball bearing 13.

In the same manner, the oil spread due to a centrifugal force by the rotation of the clutch hub 52 is introduced, along the inner periphery 52d of the clutch hub 52 in the outer diameter side, into the second through hole 52b for efficient lubrication of the separator plates 53 and the friction plates 54.

In the foregoing, the embodiments of the present invention have been described. However, the present invention is not limited to the above embodiments, but various modifications of the present invention are possible within the scope of the technical idea described in the claims, specification, and drawings.

The invention claimed is:

1. A hydraulic power transmission device comprising:
    an input shaft to which a driving force from a drive source is transmitted;
    a hydraulic clutch disconnecting the driving force transmitted to the input shaft; and
    an output shaft connected to the input shaft via the hydraulic clutch,
    wherein the hydraulic clutch includes frictional engagement elements for disconnecting the driving force and a piston chamber applying a pressing force to the frictional engagement elements,
    the hydraulic power transmission device further comprising:
    an oil pump communicating to the piston chamber and supplying hydraulic fluid flowing into the piston chamber, and
    a pressure regulating valve communicating to the piston chamber and regulating pressure of hydraulic fluid flowing out from the piston chamber,
    wherein the pressure regulating valve is arranged adjacent to the piston chamber.

2. The hydraulic power transmission device according to claim 1,
    wherein the frictional engagement elements of the hydraulic clutch comprises:
    a clutch hub provided either on an input shaft side or on an output shaft side;
    a clutch guide provided on the other side of the input shaft side and the output shaft side; and
    a frictional engagement member in which a first friction material engaged with the clutch hub and a second friction material engaged with the clutch guide are laminated alternately, and
    wherein on the clutch hub, a first through hole communicating to a bearing supporting the clutch hub and a second through hole communicating from an inner periphery of the clutch hub to an outer periphery of the clutch hub are provided, the second through hole being radially outside of the first through hole.

3. The hydraulic power transmission device according to claim 2, wherein:
- (i) on a radially outer side of an opening of the first through hole, a projection is axially projected to cover the radially outer side of the opening of the first through hole, or
- (ii) on a radially outer side of an opening of the second through hole, a projection is axially projected to cover the radially outer side of the opening of the second through hole.

4. The hydraulic power transmission device according to claim 1, comprising:
- a case accommodating at least a part of the hydraulic power transmission device; and
- a discharge port formed on an inner periphery of the case for discharging the hydraulic fluid discharged from the pressure regulating valve,
- wherein on a radially outer side of the discharge port, another projection is axially projected to cover the radially outer side of the discharge port.

5. The hydraulic power transmission device according to claim 1, further comprising a pressing load receiving member receiving a pressing load of a piston member applied to the frictional engagement elements,
- wherein a pressing member of the piston member and the pressing load receiving member are arranged at substantially a same position in a radial direction of the hydraulic power transmission device.

6. The hydraulic power transmission device according to claim 5, further comprising a case accommodating at least a part of the hydraulic power transmission device,
- wherein the pressing load receiving member is a projection that is a part of the case opposite to the frictional engagement elements projected in an axial direction towards the frictional engagement elements.

7. The hydraulic power transmission device according to claim 5, comprising a bearing rotatably supporting the input shaft,
- wherein the bearing is fixed due to a structure in which the bearing is sandwiched by a stepped part of the case and a stepped part of the input shaft.

8. The hydraulic power transmission device according to claim 5,
- wherein the piston member and the pressing load receiving member respectively comprise a first thrust bearing rotatably supporting the frictional engagement elements and a second thrust bearing rotatably supporting the frictional engagement elements, and
- wherein the first thrust bearing and the second thrust bearing are arranged at substantially a same position in the radial direction of the hydraulic power transmission device.

9. The hydraulic power transmission device according to claim 1, wherein the hydraulic fluid discharged from the pressure regulating valve is introduced to the frictional engagement elements of the hydraulic clutch without going through the inside of the input shaft or the output shaft.

10. The hydraulic power transmission device according to claim 1,
- wherein the output shaft is a pair of rotation shafts extending in a width direction of a vehicle so as to transmit a driving force to left and right driving wheels of the vehicle,
- wherein the hydraulic clutch is a pair of clutches each of which is arranged between the input shaft and each of the pair of the rotation shafts, and
- wherein the pressure regulating valve is a pair of pressure regulating valves each of which is arranged adjacent to an outer side of each of the pair of the clutches in a width direction.

* * * * *